July 3, 1956 W. J. HOGAN ET AL 2,753,038
WIREBOUND BOX BLANK INVERTER
Filed Aug. 3, 1954 2 Sheets-Sheet 1
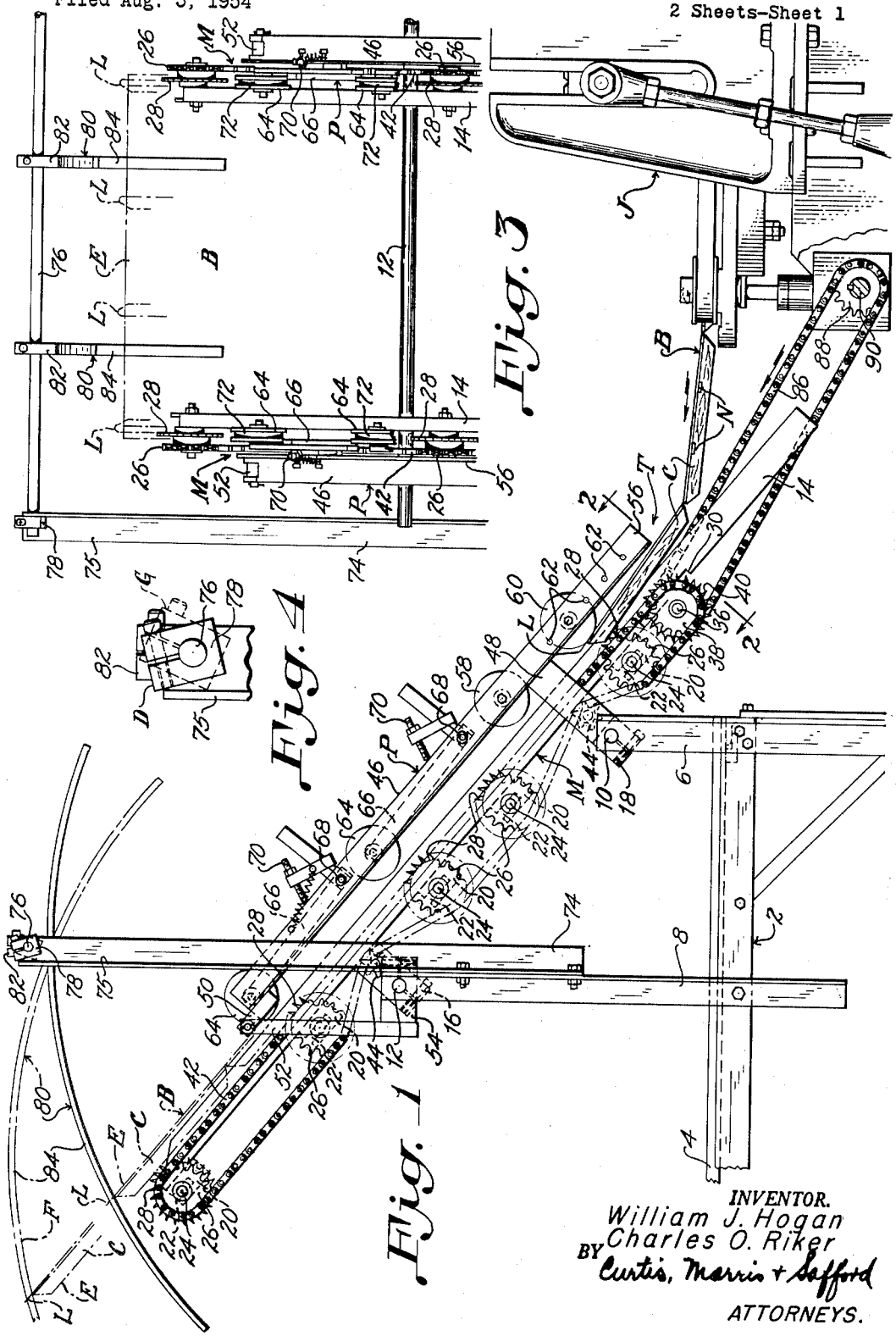
INVENTOR.
William J. Hogan
Charles O. Riker
BY Curtis, Morris + Safford
ATTORNEYS.

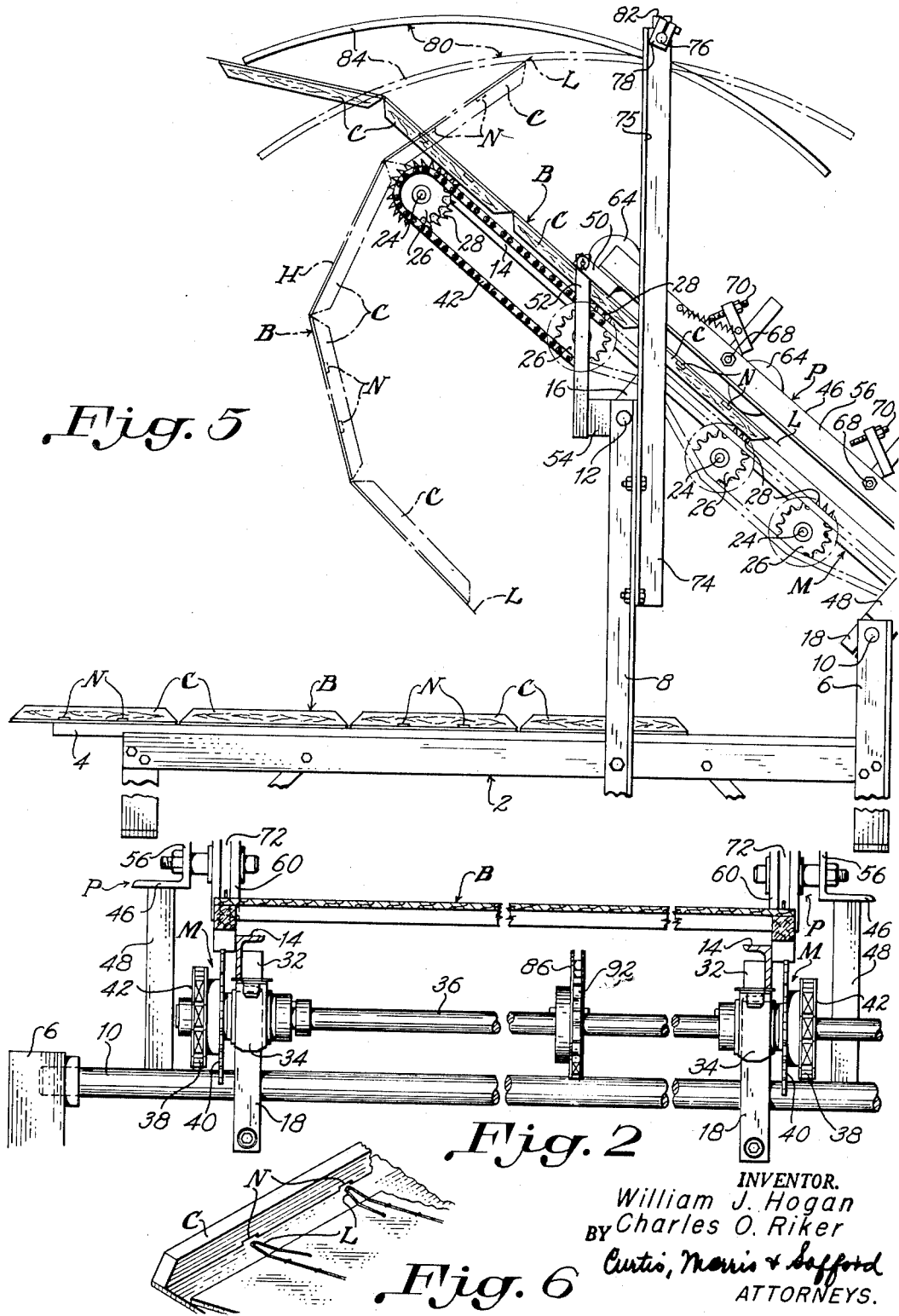

United States Patent Office 2,753,038
Patented July 3, 1956

2,753,038
WIREBOUND BOX BLANK INVERTER

William J. Hogan, Dover, and Charles O. Riker, Morristown, N. J., assignors to Stapling Machines Co., Rockaway, N. J., a corporation of Delaware Application August 3, 1954, Serial No. 447,598

3 Claims. (Cl. 198—33)

This invention relates to apparatus for inverting wirebound box blanks, for example box blanks of the general type disclosed in U. S. Patent No. 2,281,908.

Box blanks of this type, which are known in the trade as "All Bound" boxes, comprise a plurality, usually four, box sections or sides formed of side material or slats with reinforcing cleats at the outside edges thereof and with the several box sections foldably secured together by longitudinally extending binding wires secured thereto by staples driven astride the binding wires, through the side material or slats and into the cleats. Such box blanks are customarily formed in a continuous succession secured together by the binding wires in stapling machines of the general type disclosed in U. S. Patent No. 2,304,510. This continuous succession of wire-connected box blanks is fed through a loop fastener machine, for example a machine of the type disclosed in U. S. Patent No. 2,161,200, in which the binding wires are severed in the interval between each pair of adjacent box blanks and the resulting wire ends are bent to form, at either end of the box blank, loop fasteners which come into opposition with each other when the box blank is folded around to set up the box and may be interengaged to maintain the box in closed position.

The box blanks issue from the loop fastener machine in a cleats-down position. They are thereafter inverted to place them in a cleats-up position, and the two box ends are hingedly attached to the opposite edges of alternate sections of the box blank and folded down flat against the box for storage or shipment. As shown in the aforementioned Patent No. 2,281,908, the box ends are provided with binding wires which have loop fasteners formed at each end thereof, and the box ends are hingedly attached to the box blank by extending these loop fasteners through notches in the cleats and bending them around the outside binding wires of the box blank.

Heretofore it has been routine manufacturing practice for the box ends to be attached to the box blanks manually by two workmen. One of these men, who was stationed at the delivery end of the loop fastener machine, grasped the leading end of the box blank as it issued from the end of the machine and, the instant its trailing end was free, rotated the box blank on its longitudinal axis through an angle of 180° and placed it upon a table with its cleated surface up. Then each of the two men, who were at opposite sides of the table, proceeded to attach one of the box ends to the box blank. The assembled unit was thereupon removed by workmen at the off side of the table as the first workman simultaneously received another box blank from the machine. Frequently, in their haste to keep pace with the rapidly operating machines, the workmen improperly positioned the box ends or improperly bent the wire loops, producing a poorly made box.

The present invention provides a machine for mechanically inverting box blanks as they move out of the loop fastener machine, thereby dispensing with the manual operation of turning the box over, and reducing the exertion and dexterity required of the two workmen who attach the ends to the box blank and allowing them more time for supplemental operations such as stacking the completed box blanks for bundling.

The apparatus provided by the present invention is not only simple in construction and reliable in operation, but is extremely compact, requiring little more floor space than the area of the box blank itself. It is so constructed that its driving power may be derived from a conventional loop fastener machine by a comparatively simple driving connection.

In the drawings:

Figure 1 is a side elevational view of a wirebound box blank inverter embodying features of the present invention, in proper position adjacent the output end of a loop fastener machine.

Figure 2 is a fragmentary transverse sectional view of the inverting apparatus, at a slightly enlarged scale, taken generally along the line 2—2 of Figure 1.

Figure 3 is a fragmentary end elevational view of the apparatus, on the same scale as Figure 1 and looking toward the end of the apparatus which appears at the right-hand side of Figure 1.

Figure 4 is a fragmentary side elevational view, at greatly enlarged scale, of the means for supporting and limiting movement of the deflecting elements which appear at the top of Figure 1.

Figure 5 is a fragmentary view similar to Figure 1 showing a wirebound box blank in the process of being inverted.

Figure 6 is an isometric view of a fragmentary portion of a wirebound box blank illustrating the operation of inserting the loop fasteners on the box end into the notches in the cleats of the box blanks.

In Figure 1, a box blank inverting apparatus embodying features of the present invention, generally indicated T, is shown positioned at the output end of a loop fastener machine J of the type disclosed in the aforementioned U. S. Patent No. 2,161,200. The inverting apparatus includes a base 2 which supports a pair of longitudinally extending horizontal bars 4. Extending upwardly from the base 2 are two pairs of vertical members 6 and 8, with the members 8 extending to a height approximately three times that of the members 6. The upper portions of the members 6 are provided with holes to support the opposite ends of a transverse rod 10 and the upstanding members 8 similarly support a transverse rod 12.

This framing arrangement supports a pair of laterally spaced conveying mechanisms M which are identical except for the fact that the one at the left-hand side of the apparatus, as viewed in Figure 3, is laterally fixed in position while the one at the right-hand side is adjustable laterally to accommodate box blanks of different width. It will therefore suffice to describe only the left-hand conveying mechanism.

As may be seen in Figure 1, this conveying mechanism includes an elongated guide rail 14 which serves as a supporting base. This guide rail 14 has projecting downwardly from its under surface a pair of short legs 16 and 18. The upper leg 16 has near its lower end a hole to receive the aforementioned transverse rod 12, with suitable clamping means to secure it on the rod 12. The lower leg 18 similarly has near its lower end a hole for receiving the transverse rod 10 and is provided with suitable clamping means for fixing it on the rod 10.

Fastened to the under surface of guide rail 14 at suitably spaced intervals are a plurality of blocks 20 provided with open-end slots 22 to adjustably receive headed bolts 24 which rotatably support sprockets 26 having fixed at their inner faces spur wheels 28.

As may be seen in Figure 1, the under side of guide rail 14 near its lower right-hand end is provided with a shallow notch 30 in which is received a block 32 (Figure 2) to the under side of which is secured a bearing 34 which rotatably supports one end of a transverse drive shaft 36. Keyed to the outer end of drive shaft 36 is a sprocket 38 with a spur wheel 40 fixed at its inner face.

The spur wheels 28 are driven in a counterclockwise direction, as viewed in Figure 1, by a drive chain 42 which is trained about the sprocket 38 on the drive shaft 36 and about the sprockets 26 on which each of the spur wheels 28 are fixed. To maintain the desired degree of tension in the drive chain 42, and insure meshing of the chain with each of the sprockets 26, the lower run of the chain is also trained about idler sprockets 44 rotatably mounted on short studs threaded into the outer faces of legs 16 and 18.

As may be seen in Figures 1, 2, 3 and 5, the inverting apparatus also includes an overhead presser unit, generally indicated P, which presses the box blanks against the spur wheels 28 to assure positive driving of the box blanks. This presser unit P includes a longitudinal base member 46, the lower, right-hand end of which is supported by a vertical leg 48 secured to its under surface and resting upon the transverse rod 10. The upper, left-hand end of the base member 46 is supported by a block 50 which extends beyond this end of the base member and is slotted to receive hingedly the upper end of a vertical arm 52 of an L-shaped bracket 54 which is clamped to the transverse rod 12.

The base member 46 supports presser rollers 58 and 60 which are rotatably mounted on short studs threaded into the inner face of the vertical flange 56 of the angular base member 46. The base member 46 is provided with a series of threaded holes 62 to permit the position of the roller 60 to be changed to accommodate box blanks of various constructions.

Two other presser rollers 64 are rotatably mounted on short studs threaded into the inner faces of the free ends of arms 66 which are pivotally mounted at 68 on the inner face of the vertical flange 56 of base member 46. Each of the arms 66 is provided with an adjustable stop screw 70 for retaining the presser rollers 64 at the desired height in relation to the upper surface of the box blanks. All four of the presser rollers in each conveying mechanism are in longitudinal alignment and, as shown in Figure 2, the face of each has formed therein a peripheral groove 72 to receive the binding wires and staples adjacent the outer edge of the box blank, and permit the remaining portion of the face of each presser roller to be in contact with the face material of the box blank.

As shown in Figures 1 and 5, the upstanding members 8 at either side of the base 2 have bolted to their right-hand face, as viewed in Figure 1, extension angle members 74, the upper ends of which are provided with holes to receive loosely a transversely extending rock shaft on each outwardly projecting end of which is clamped a generally rectangular clamp block 78. Adjustably mounted on the rock shaft 76, between the supporting angle members 74 are a pair of deflectors 80 each of which includes a hanger member 82 clamped on to the rock shaft 76 and having fastened to its bottom face an elongated arcuate bar 84.

Each of the arcuate bars 84 is attached to its hanger member 82 at such a point along the length of the bar that the bar extends to the left of the hanger member, as viewed in Figure 1, considerably farther than it extends to the right, so that the force of gravity tends to urge the arcuate bars 84 in a counterclockwise direction. The rectangular clamp block 78 not only prevents endwise shifting of the rock shaft 76, but also limits the pivoting movement of the deflectors 80 by engagement with the flange 75 of angle member 74 as indicated in Figure 4 by broken lines G and full lines D.

As may be seen in Figures 1 and 2, the driving power for the inverting apparatus T is derived from the loop fastener machine J through a chain 86 which is trained about a sprocket 88 keyed to the drive shaft 90 of the loop fastener machine and about a sprocket 92 keyed to the drive shaft 36 (Figure 2) of the inverting apparatus. As more fully described in the aforementioned Patent No. 2,161,200 the drive shaft 90 in the loop fastener machine J provides power to drive the mechanism which conveys the box blanks through the loop fastener machine; the inverting apparatus is thus driven in synchronism with the loop fastener machine.

The operation of the box blank inverter is as follows:

During operation of the loop fastener machine, a series of separate box blanks B issues from its output end and onto the elongated guide rails 14 of the inverter. As each of the box blanks B enters the input end of the inverter, its leading end is received between the spur wheels 28 and the rollers 60 of the hingedly mounted presser units P. With the rollers 60 pressing the box blank downwardly so that the teeth of the spur wheels 28 are in biting engagement with the under surfaces of the cleats C of the box blank, the spur wheels 28 are driven in a counterclockwise direction, as viewed in Figure 1, through the driving mechanism previously described, and thus the box blank is driven obliquely upward, being guided along the guide rails 14 which engage the inner faces of the cleats C.

As the leading end of the box blank B passes the upper ends of the guide rails 14, it continues outwardly into engagement with the deflectors 80, as indicated by broken lines E in Figure 1. As the box blank continues upwardly, the deflectors 80 pivot in a clockwise direction, as illustrated by broken lines F in Figure 1, to the point where further pivoting movement of the deflectors 80 is prevented by engagement of the clamp blocks 78 with the flanges 75 of angle members 74, as illustrated by broken lines G in Figure 4. At this point, the leading section of the box blank will have entirely cleared the upper ends of the guide rails 14 and, as the box blank is driven farther upwardly, its leading section will be bent downwardly by the deflectors 80, as shown in full lines in Figure 5.

This same process of bending will occur as each successive box section clears the guide rails 14. Thus, the box blank will be progressively bent in a generally concave fashion, as shown by broken lines H in Figure 5, with the binding wires being stiff enough to maintain this curvature despite the weight of the box blank and the resulting tendency for it to hang straight downwardly.

The cumulative curvature of the box blank is such that its leading end is ultimately moving in a direction having a substantial component opposite to its original direction of movement.

To best achieve this partial inversion of the box blank, the space between the output end of the conveying mechanism and the support below should be open and unobstructed and should extend for a vertical distance at least of the order of the total length of the three leading sections of the box blank, so that, as illustrated in broken lines in Figure 5, the three leading sections of the box blank may hang freely from the output end of the conveying mechanism. Thus, when the last section of the box blank clears the guide rails 14, the box blank will drop onto the elongated bars 4 of base 2 and assume a fully inverted position.

As may be seen in Figure 6, the inversion of the box blanks will place it in such position that the loop fasteners L on the binding wires stapled to the box end may be conveniently inserted into the notches N in the cleats C and bent around the outside binding wires of the box blank to secure the box end hingedly to the box blank.

As will be understood from the foregoing description, the construction of the box blank inverter is such that each box blank follows a path which extends first in one direction and then in the reverse direction, with these two portions of the box blank path being superimposed one above the other. This makes possible an inverter which occupies little more floor space than the box blank itself. The mechanism is substantially foolproof in operation, and is so constructed that its driving power may conveniently be obtained from a conventional loop fastener machine. It will therefore be appreciated that the aforementioned and other desirable objects have been achieved. However, it should be emphasized that the embodiment of the invention which is shown and described herein is intended as merely illustrative and not as restrictive of the invention.

We claim:

1. Apparatus for inverting wirebound box blanks of the type having a plurality of box sections foldably secured together by binding wires, said apparatus comprising a conveyor for moving said box blanks endwise, a deflector extending obliquely forward and downward across the path of said box blanks in position to engage said box sections in succession when they are entirely clear of the output end of said conveyor and bend them downwardly relative to the succeeding sections to produce a progressive bending and partial inversion of said box blanks, and a horizontal support for said box blanks positioned beneath the output end of said conveyor, the space between said conveyor and said support being open and unobstructed and extending for a vertical distance at least of an order equal to the total length of the first three sections of said box blank to permit said sections to hang freely from said output end and to fall freely downwardly onto said support and assume a fully inverted position.

2. Apparatus for inverting wirebound box blanks comprising a conveyor for receiving said box blanks and moving them endwise, said conveyor including a plurality of spur wheels positioned to engage the undersurfaces of the cleats of said box blanks and a plurality of yieldably mounted presser elements positioned to engage the opposite surfaces of said box blanks and press said cleats into biting engagement with said spur wheels, a deflector extending obliquely forward and downward across the output end of said conveyor to engage said box blanks and bend them progressively downward to produce a partial inversion thereof and a horizontal support for said box blanks positioned beneath the output end of said conveyor a distance sufficient to permit the partially inverted box blanks to fall downwardly onto said support in a fully inverted position.

3. Apparatus for inverting wirebound box blanks comprising a conveyor for receiving said box blanks and moving them endwise, at least one arcuate deflector member pivotally mounted so as normally to extend obliquely forward and downward at a relatively steep angle across the output end of said conveyor but yieldingly pivotable to a deflected position more nearly parallel to the path of said box blanks on said conveyor, whereby each successive section of said box blank will engage said deflector and press the same outwardly to its deflected position at which such section will be entirely clear of said conveyor and may be bent downwardly by said deflector to produce a progressive bending and partial inversion of said box blank, and a horizontal support for said box blanks positioned beneath the output end of said conveyor a distance sufficient to permit the partially inverted box blanks to fall downwardly onto said support in a fully inverted position.

References Cited in the file of this patent

UNITED STATES PATENTS

| | | |
|---|---|---|
| 1,292,178 | Waterman | Jan. 21, 1919 |
| 1,519,154 | Mitton | Dec. 16, 1924 |
| 1,926,060 | Peters | Sept. 12, 1933 |
| 2,563,432 | Sterler | Aug. 7, 1951 |